(12) United States Patent
Huang

(10) Patent No.: US 11,543,826 B2
(45) Date of Patent: Jan. 3, 2023

(54) SYSTEM AND METHOD FOR NAVIGATING A TURN BY AN AUTONOMOUS VEHICLE

(71) Applicant: DEKA Products Limited Partnership, Manchester, NH (US)

(72) Inventor: Siyuan Huang, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 96 days.

(21) Appl. No.: 17/214,045

(22) Filed: Mar. 26, 2021

(65) Prior Publication Data

US 2022/0019226 A1    Jan. 20, 2022

Related U.S. Application Data

(60) Provisional application No. 63/053,041, filed on Jul. 17, 2020.

(51) Int. Cl.
*G05D 1/02* (2020.01)

(52) U.S. Cl.
CPC ........... *G05D 1/0214* (2013.01); *G05D 1/024* (2013.01); *G05D 1/0248* (2013.01)

(58) Field of Classification Search
CPC .... G05D 1/0214; G05D 1/024; G05D 1/0248; G05D 2201/0213; G05D 1/0212; B62D 15/0265
See application file for complete search history.

(56) References Cited

U.S. PATENT DOCUMENTS

2021/0200213 A1 *   7/2021   Gillett ................... G01S 13/931

* cited by examiner

*Primary Examiner* — Rodney A Butler
(74) *Attorney, Agent, or Firm* — Kathleen Chapman

(57) ABSTRACT

Spin controller that can enable an autonomous vehicle (AV) to spin in place. A model predictive controller (MPC) can trigger the spin controller any time the MPC determines that a spin in place is required. In some configurations, the spin controller can move the AV to within 5° of the destination point. Spin controller can determine spin method based on the configuration of the AV, calculate an optimum turning path based at least on device mode and obstacles, and can enable the AV to spin in place.

20 Claims, 7 Drawing Sheets

SYSTEM AND METHOD FOR NAVIGATING A TURN BY AN AUTONOMOUS VEHICLE

CROSS REFERENCE TO RELATED APPLICATIONS

This application claims the benefit of U.S. Provisional Application Ser. No. 63/053,041, filed Jul. 17, 2020, entitled SYSTEM AND METHOD FOR NAVIGATING A TURN BY AN AUTONOMOUS VEHICLE, which is incorporated herein by reference in its entirety.

BACKGROUND

The present teachings relate generally to autonomous vehicle navigation, and in particular to reaching a destination requiring a sharp turn of the autonomous vehicle.

Autonomous vehicles can experience both automatic and manual control, and when it comes to turning sharply, autonomous vehicles typically rely on an operator to navigate such a complicated move. Autonomous recognition of possible sharp turns typically takes the form of map annotations for a possible purpose of discerning how an operator navigates the pre-mapped sharp turn.

What is needed is a system and method for responding to a dynamically-determined need to, for example, avoid an obstacle by spinning the autonomous vehicle in place before proceeding on an alternate path that does not encounter the obstacle.

SUMMARY

The spin controller of the present teachings enables an autonomous vehicle (AV) to spin in place. In some configurations, a model predictive controller (MPC) can trigger the spin controller any time the MPC determines that a spin in place is required. For example, the MPC can calculate an angle for the spin based at least on the orientation of the AV and can trigger the spin controller accordingly. The MPC can choose the path to the destination based on the smallest total cost, calculated according to well-known procedures. In some configurations, the spin controller can move the AV to within 5° of the destination point.

BRIEF DESCRIPTION OF THE DRAWINGS

The present teachings will be more readily understood by reference to the following description, taken with the accompanying drawings, in which.

DETAILED DESCRIPTION

The system and method of the present teachings can chart a path between the current location of an autonomous vehicle (AV) and a destination, where the path to the destination requires the AV to spin in place.

Figure 1:
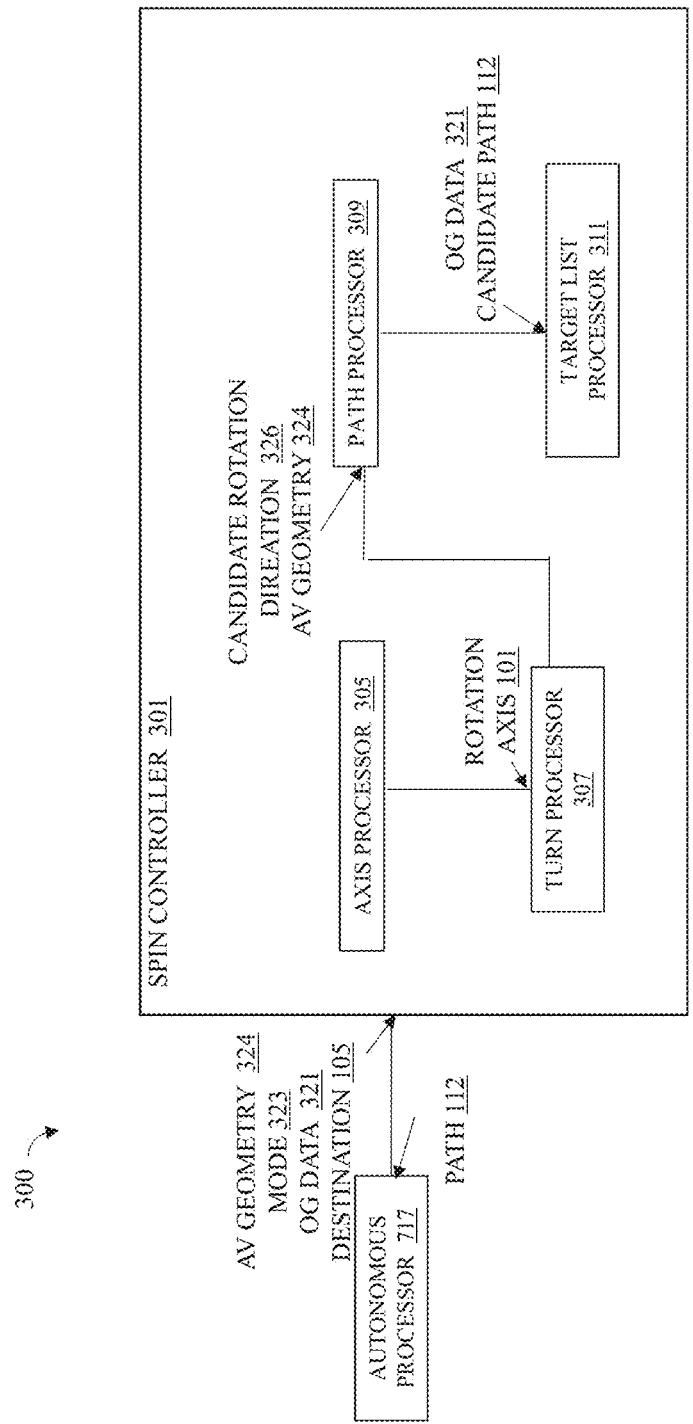
FIG. 1 is a schematic block diagram of the system of one configuration of the present teachings.

Referring now to FIG. 1, system 300 for enabling a traveling AV to navigate a relatively sharp turn can include, but is not limited to including, spin controller 301 that can determine which direction the AV should proceed to accomplish a safe spin in place towards destination 105. Spin controller 300 can receive mode 323, destination 105, and occupancy grid data 321 when the AV is stopped and the MPC has determined that a spin in place of the AV is required. Spin controller 301 can provide path 112 to autonomous processor 717 for the AV to travel towards destination 105. Spin controller 301 can include, but is not limited to including, axis of rotation processor 305, turn processor 307, path processor 309, and target list processor 311.

Continuing to refer to FIG. 1, axis of rotation processor 305 can receive mode 323 and coordinates for destination 105, and can determine axis of rotation 101 based at least on mode 323. Turn processor 307 can determine the angles that the AV would have to rotate to achieve arriving at the destination based at least on axis of rotation 101. The angles can include an angle $\alpha$ that would have the AV rotating in a clockwise direction to reach destination 105, and an angle $\beta$ that would have the AV rotating in a counterclockwise direction to reach destination 105. If 157 $\alpha \geq \beta$, turn processor 307 can include setting candidate rotation direction 326 equal to counterclockwise, and if 157 $\alpha < \beta$, turn processor 307 can include setting candidate rotation direction 326 equal to clockwise. After candidate rotation direction 326 is determined, path processor 309 can determine candidate path 112 that the AV could take to destination 105 based at least on AV geometry 324 and candidate rotation direction 326. Path processor 309 can include determining the length, referred to herein as the first length, of the line between axis of rotation 101 and a corner of the 2D depiction of the AV as determined from AV geometry 324. For example, the line can connect the position of axis of rotation 101 with the position of the upper right corner of the 2D depiction of the AV (the front right lower corner of the AV) as determined from AV geometry 324. Path processor 309 can include drawing a line of the first length, the line beginning at axis of rotation 101 and extending, perpendicularly, through the upper boundary of the 2D depiction of the AV as determined from AV geometry 324. Path processor 309 can include determining the length, referred to herein as the second length, of the line between axis of rotation 101 and another corner of the 2D depiction of the AV as determined from AV geometry 324. For example, the line can connect the position of axis of rotation 101 with the position of the lower right corner of the 2D depiction of the AV (the right rear corner of the AV) as determined from AV geometry 324. Path processor 309 can include drawing a line of the second length, the line beginning at axis of rotation 101 and extending, perpendicularly, through the lower boundary of the 2D depiction of the AV as determined from AV geometry 324. Path processor 309 can include drawing 171 a polygon around the AV as determined from AV geometry 324. The polygon can include two opposing sides, each of the opposing sides being a third length equaling the addition of the first and second lengths. The opposing sides can be positioned perpendicular to and at the ends of the lines of first length and second length drawn perpendicular to the upper and lower 2D boundaries. Path processor 309 can create a path between the AV and destination 105. The path between the AV and destination 105 can be drawn to give the AV room to move its body through the sharp turn. Path processor 309 can include creating a path by laying lines the length of the third length end to end between the AV and destination 105 and marking the intersections of the lines as way points. The lines can fall within a minimum bounding circle including destination 105 and the upper right corner of the 2D image of the AV (the lower corner of the AV as determined from AV geometry 324 heading into the turn). Target list processor 311 can determine obstacles along candidate path 112 based on occupancy grid data 321. If there are obstacles along candidate path 112, path processor 309 can include changing the rotation direction and checking for obstacles in the new candidate direction. If target list processor 311 finds no obstacles in the path, path processor 309 can include supplying candidate path 112 to target list processor 311. Target list processor 311 can check for obstacles in OG data 321 each time OG data 321 are received. In some configurations, OG data 321 can be received at a rate of 50 Hz.

Figure 2A:
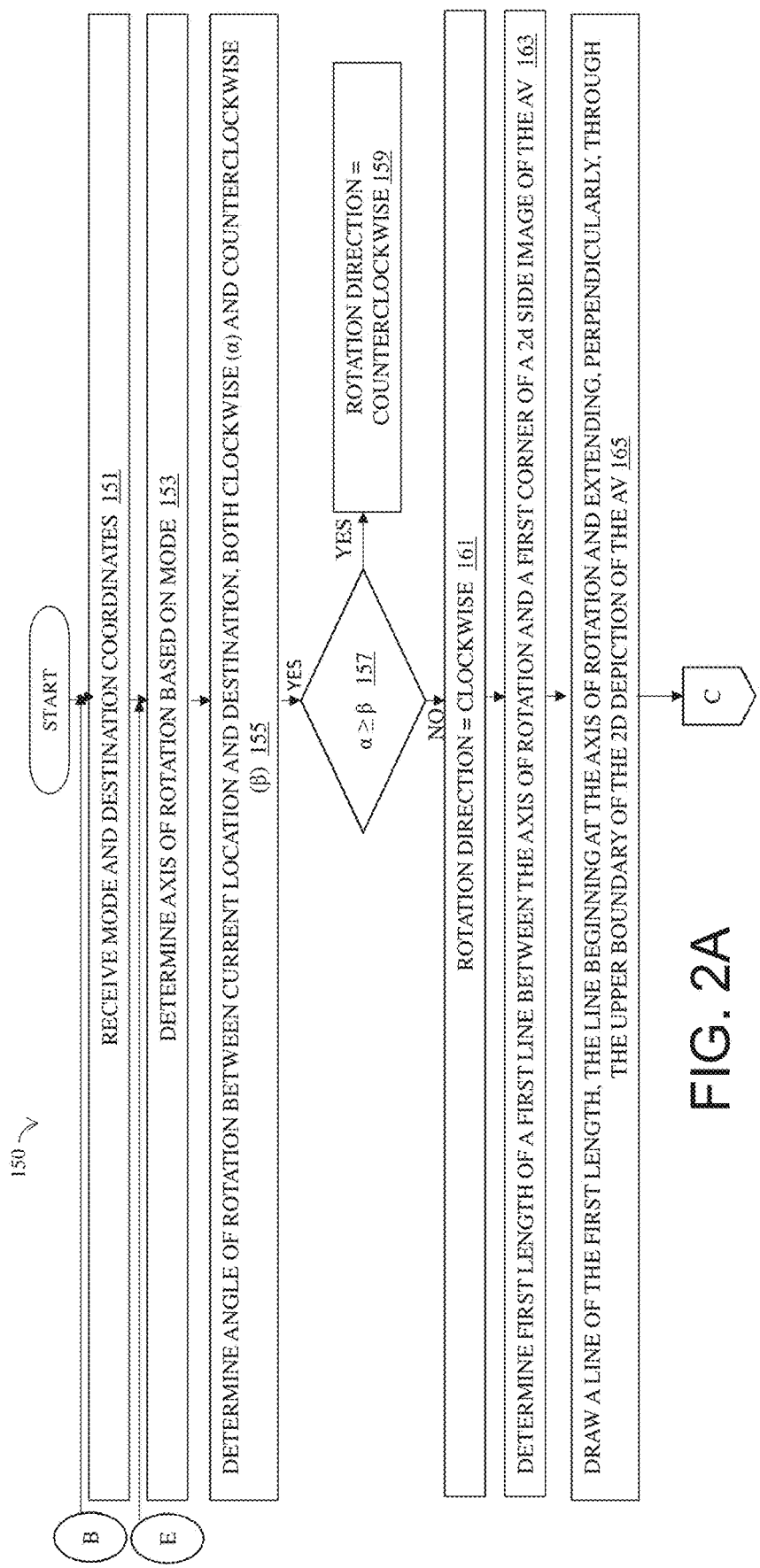
FIGS. 2A-2C are flowcharts of the method of the present teachings.

Referring now to FIG. 2A, method 150 for enabling a traveling AV to navigate a relatively sharp turn by spinning in place can include, but is not limited to including, receiving 151 the mode of the AV and the coordinates of a destination, and determining 153 the axis of rotation of the AV based on the mode. The mode can reflect the current configuration of the AV. In some configurations, the mode can indicate how many wheels of the AV are making contact with the surface, for example. In some configurations, the AV can include two rear drive wheels and two front drive wheels, as well as two caster wheels. A first mode, referred to herein for convenience as standard mode, can indicate that the two rear drive wheels and the two caster wheels are in contact with the ground. A second mode, referred to herein for convenience as enhanced mode, can indicate that all four drive wheels are in contact with the ground. There is no limit to the number of modes possible. Each mode can be associated with a process for determining an associated axis of rotation of the AV. As the AV travels and encounters various surface features, the mode of the AV can be adjusted as the travel conditions change. For example, if the AV is operating in enhanced mode, the axis of rotation can be located at the center of the AV, whereas if the AV is operating in standard mode, the axis of rotation can be located between the rear drive wheels. These axes are chosen based on the assumption that the motion of the AV is purely rotational and without linear motion. The actual rotation might not be purely rotational because of frictional and motor outputs.

Continuing to refer to FIG. 2A, method 150 can include determining 155 the angles that the AV would have to rotate to achieve arriving at the destination. The angles can include an angle $\alpha$ that would have the AV rotating in a clockwise direction to reach the destination, and an angle $\beta$ that would have the AV rotating in a counterclockwise direction to reach the destination. For example, if 157 $\alpha \geq \beta$, method 150 can include setting 159 the rotation direction equal to counterclockwise, and if 157 $\alpha < \beta$, method 150 can include setting 161 the rotation direction equal to clockwise. After the axis of rotation and the rotation direction are determined, the path that the AV takes to the destination can be determined by a process as follows. Method 150 can include determining 163 the length, referred to herein as the first length, of the line between the axis of rotation and a corner of the 2D depiction of the AV. For example, the line can connect the position of the axis of rotation with the position of the upper right corner of the 2D depiction of the AV. Method 150 can include drawing 165 a line of the first length, the line beginning at the axis of rotation and extending, perpendicularly, through the upper boundary of the 2D depiction of the AV.

Figure 2B:
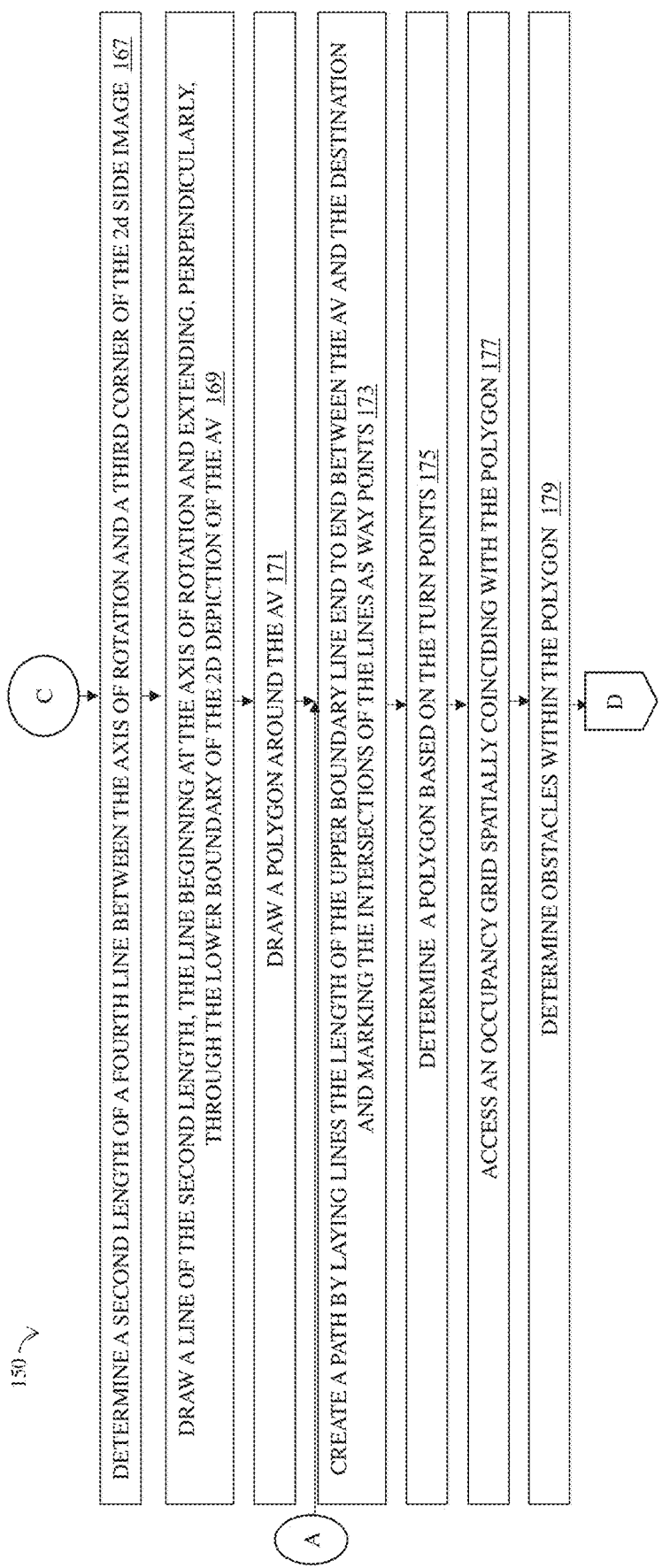

Referring now to FIG. 2B, method 150 can include determining 167 the length, referred to herein as the second length, of the line between the axis of rotation and another corner of the 2D depiction of the AV. For example, the line can connect the position of the axis of rotation with the position of the lower right corner of the 2D depiction of the AV. Method 150 can include drawing 169 a line of the second length, the line beginning at the axis of rotation and extending, perpendicularly, through the lower boundary of the 2D depiction of the AV. Method 150 can include drawing 171 a polygon around the AV. The polygon can include two opposing sides, each of the opposing sides being a third length equaling the addition of the first and second lengths. The opposing sides can be positioned from the AV, and the polygon can include upper and lower boundary lines connecting opposing ends of the two sides. The polygon can include a leading corner of the AV chosen based on the rotation direction. The path between the AV and the destination can be drawn to give the AV room to move its body through the sharp turn. Method 150 can include creating 173 a path by laying lines the length of the upper boundary line end to end between the AV and the destination and marking the intersections of the lines as way points. Method 150 can include determining 175 a polygon based on the turn points, accessing 177 an occupancy grid spatially coinciding with the polygon, and determining 179 obstacles within the polygon based on logodds data from the occupancy grid.

Figure 2C:
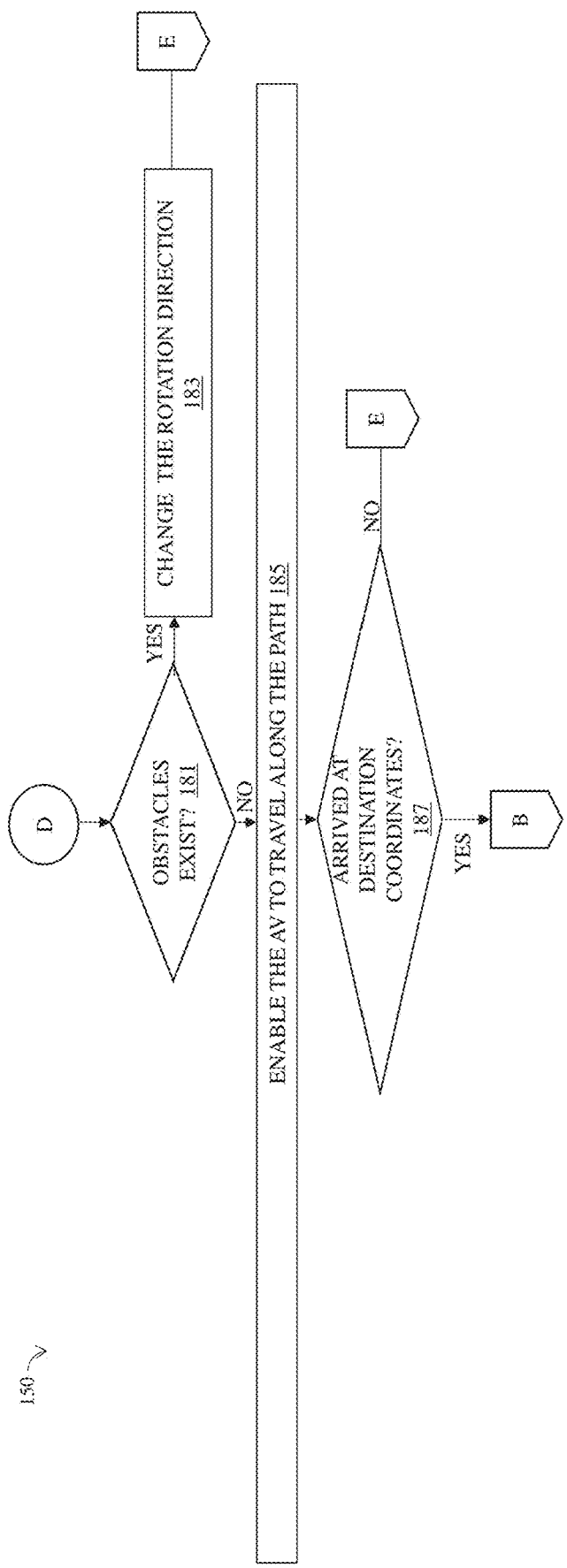

Referring now to FIG. 2C, if 181 there are obstacles in the polygon, method 150 can include changing 183 the rotation direction, and returning to step 173. If 181 there are no obstacles in the polygon, method 150 can include enabling 185 the AV to travel along the path. If 187 the AV has arrived at the destination, method 150 can include returning to step 151. If 187 the AV has not arrived at the destination, method 150 can include returning to step 153.

Figure 3:
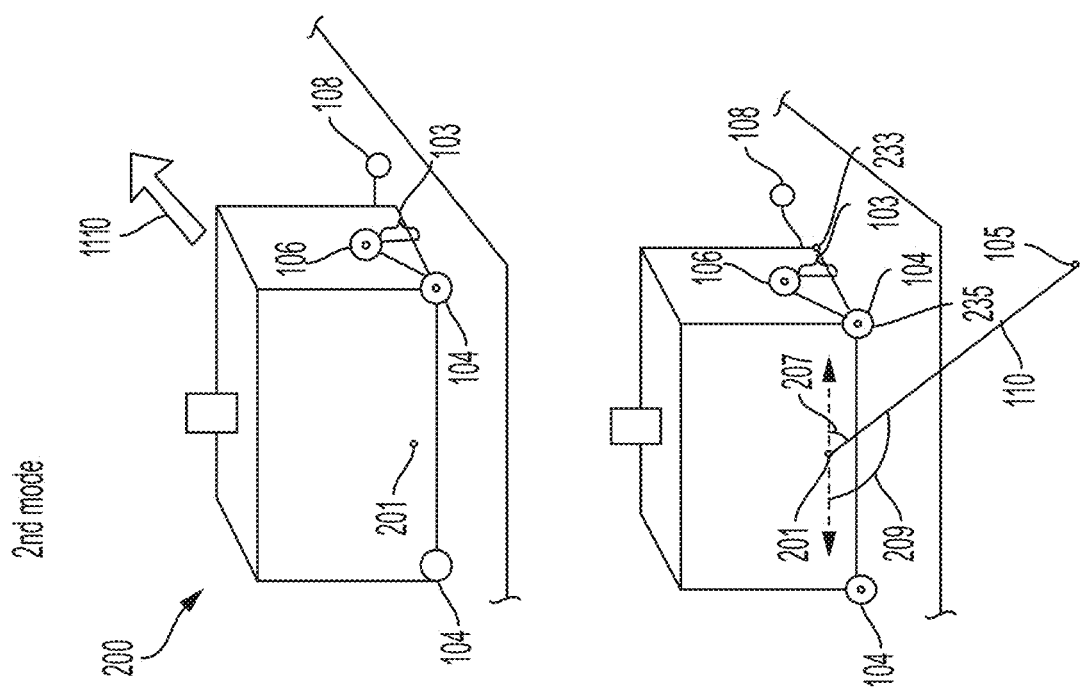
FIGS. 3-5B are pictorial description of the method of the present teachings.
Figure 3:
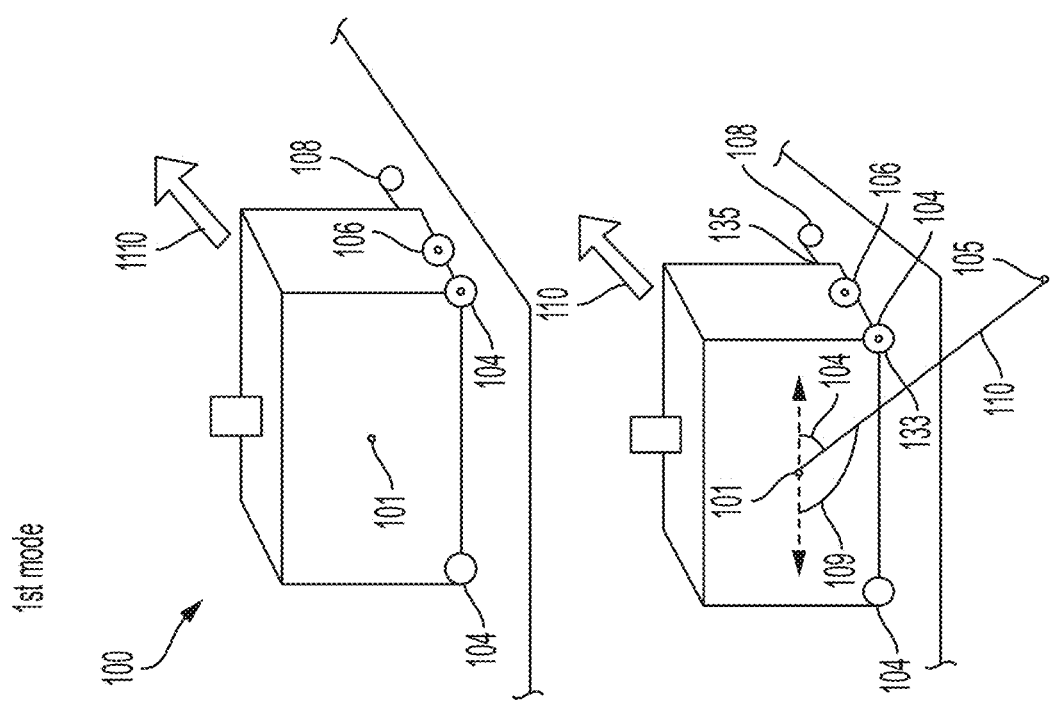

Referring now to FIG. 3, AV 100 in a first configuration referred to herein as enhanced mode, and AV 200 in a second configuration known herein as standard mode, can include rear drive wheels 104, front drive wheels 106, and casters wheels 108. AV 100/200 are shown in rear view traveling in direction 1110. In standard mode, front drive wheels 106 are elevated from the surface by amount 103 for the purpose of accommodating relatively uniform surfaces. In enhanced mode, front drive wheels 106 ride on the surface and caster wheels 108 can be elevated for the purpose of accommodating more challenging terrain. To reach destination 105, AV 100/200 must make a relatively sharp turn. To achieve the turn, various computations and comparisons can be performed, as AV 100/200 begin the turn, and processed sensor data can guide the travel path as AV 100/200 proceeds through the turn.

Continuing to refer to FIG. 3, an axis of rotation can be determined for each of AV 100/200 based on the configuration. For example, axis of rotation 101 for the first configuration can be established as the center of AV 100, and axis of rotation 201 for the second configuration can be established as the center point between rear wheels 104. The axes of rotation can be established based on the centers of gravity of AV 100/200, for example. In either case, line 110 can be drawn between axis of rotation 101/201 and destination 105. Clockwise angles 107/207 can be determined between the x-axis and line 110 as if AV 100/200 were traveling in a clockwise direction. Likewise, counterclockwise angles 109/209 can be determined between the x-axis and line 110 as if AV 100/200 were traveling in a counterclockwise direction. The absolute values of clockwise angles 107/207 and counterclockwise angles 109/209 can be compared with each other for the purpose of determining the smallest amount of rotation and the shortest distance of travel that AV 100/200 would take should one direction or another be chosen.

Figure 4B:
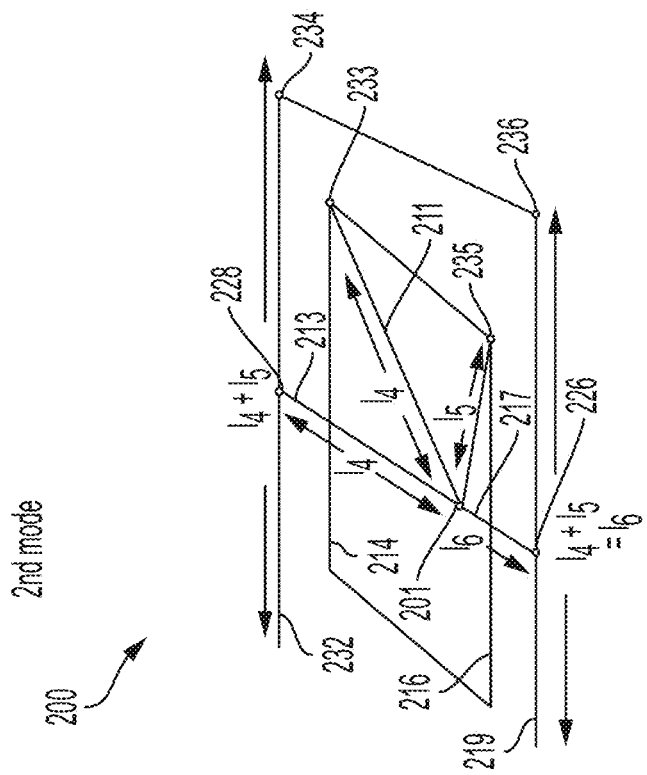
Figure 4A:
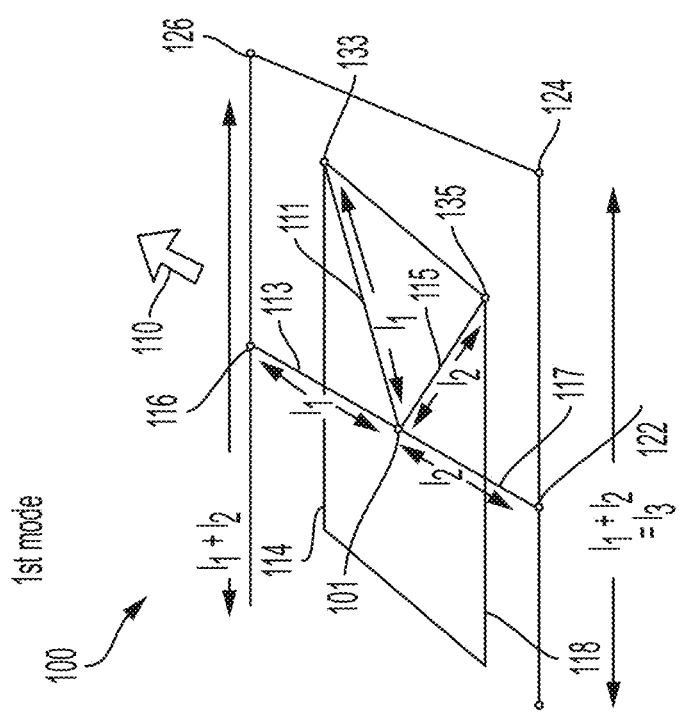

Referring now to FIG. 4A, when a new direction of travel is chosen, that can be used to move AV 100/200 from direction of travel 1110 to destination 105, a new travel path can be determined. When determining the new travel path to reach desired destination 105, the size of AV 100/200 can be taken into account so that the turn can be smooth as well as tight. With respect to AV 100, to determine a leg of new travel path 112, line 111 of length $l_1$ can be drawn to connect axis of rotation 101 with corner 133, and line 113 of length $l_1$ can be drawn perpendicular to and through edge 114 to point 116. Line 115 of length $l_2$ can be drawing to connect axis of rotation 101 with corner 135, and line 115 of length $l_2$ can be drawn perpendicular to and through edge 118 to point 122. Lengths $l_1$ and $l_2$ can be added together to form length $l_3$, and lines of length $l_3$ can be drawn perpendicular to lines 116/117 with their centers at points 116 and 122. Line 119 can connect lines 119 and lines 128 at corners 126 and 124.

Referring now to FIG. 4B, with respect to AV 200, to determine a leg of new travel path 212, line 211 of length $l_4$ can be drawn to connect axis of rotation 201 with corner 233, and line 213 of length $l_4$ can be drawn perpendicular to and through edge 214 to point 228. Line 211 of length $l_4$ can be drawing to connect axis of rotation 201 with corner 235, and line 215 of length $l_4$ can be drawn perpendicular to and through edge 216 to point 226. Lengths $l_3$ and $l_4$ can be added together to form length $l_5$, and lines of length $l_5$ can be drawn perpendicular to lines 214/216 with their centers at points 228 and 226. Line 244 can connect lines 219 and 232 at corners 236 and 234.

Figure 5A:
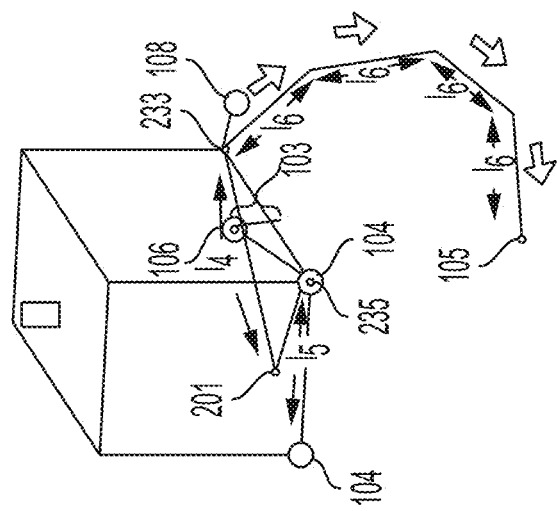

Referring now to FIG. 5A, to create travel path 112 for AV 100, lines of length $l_3$ can be connected end to end within minimum bounding circle 112A, including points 133 and 105. Each end of the lines can represent a waypoint in new travel path 112.

Figure 5B:
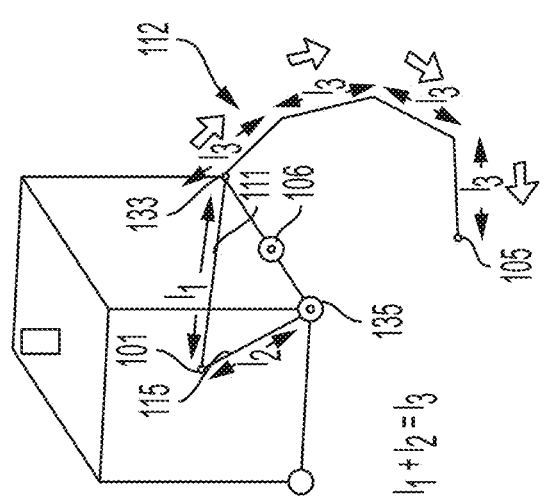

Referring now to FIG. 5B, to create travel path 212 for AV 100, lines of length $l_6$ 217 can be connected end to end within minimum bounding circle 212A, including points 233 and 105. Each end of the lines can represent a waypoint in new travel path 212.

Referring now to FIGS. 5A and 5B, AV 100/200 can include sensors that can detect obstacles according to conventional methods. For example, AV 100/200 can be configured with LIDAR sensors, ultrasonic sensors, and/or image sensors, among others. Point cloud data, for example, can be collected, and obstacles can be located based on the point cloud data according to conventional methods. AV 100/200 can reverse directions and travel along the previously-determined, but not selected, path, for example, the counterclockwise path, depending upon the obstacle landscape of new travel path 112/212. When the direction is reversed, travel legs can be determined in the same way as described herein for the chosen direction, for example, the clockwise direction.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software/firmware/hardware for accomplishing the methods discussed herein, and computer readable media storing software for accomplishing these methods. The various modules described herein can be accomplished on the same CPU, or can be accomplished on different CPUs.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

In compliance with the statute, the present teachings have been described in language more or less specific as to structural and methodical features. It is to be understood, however, that the present teachings are not limited to the specific features shown and described, since the means herein disclosed comprise various ways of putting the present teachings into effect. While the present teachings have been described above in terms of specific configurations, it is to be understood that they are not limited to these disclosed configurations. Many modifications and other configurations will come to mind to those skilled in the art to which these teachings pertain, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for spinning an autonomous device (AV) in place comprising:
    (a) receiving a mode of the AV and coordinates of a destination to which the AV is headed;
    (b) determining an axis of rotation of the AV based on the mode;
    (c) determining a clockwise rotation angle $\alpha$ and a counterclockwise rotation angle $\beta$ between a current heading of the AV and the destination;
    (d) setting a rotation direction of the AV to counterclockwise if $\alpha \geq \beta$, and setting the rotation direction to clockwise if $\alpha < \beta$;
    (e) determining a path to reach the destination;
    (f) enabling the AV to travel along the path;
    (g) if the AV is at the destination, returning to (a); and
    (h) if the AV is not at the destination, returning to (b).

2. The method as in claim 1 wherein determining the path to reach the destination comprises:
    (i) determining a first length of a first line between the axis of rotation and a first corner a 2D depiction of the AV;

(j) drawing a second line of the first length, the second line beginning at the axis of rotation and extending, perpendicularly, through a first boundary of the 2D depiction of the AV;
(k) determining a second length of a third line between the axis of rotation and a second corner of the 2D depiction of the AV;
(l) drawing a fourth line of the second length, the fourth line beginning at the axis of rotation and extending, perpendicularly, through a second boundary of the 2D depiction of the AV;
(m) drawing a first polygon around the 2D depiction of the AV, the first polygon including two opposing sides, each of the two opposing sides being a third length equaling a summation of the first length and the second length, the including the first boundary and the second boundary, the first boundary and the second boundary connecting opposing ends of the two opposing sides, the first polygon including a leading corner of the 2D depiction of the AV, the leading corner being chosen based on the rotation direction; and
(n) creating the path by laying lines a fourth length of the first boundary end to end between the AV and the destination;
(o) determining a second polygon based on turn points;
(p) accessing an occupancy grid spatially coinciding with the second polygon;
(q) determining obstacles within the second polygon based on the occupancy grid; and
(r) if the obstacles are found in the second polygon, changing the rotation direction and returning to (n).

3. The method as in claim 1 wherein the mode comprises:
at least one configuration of the AV.

4. The method as in claim 1 wherein the mode comprises:
at least one configuration of wheels of the AV.

5. The method as in claim 1 wherein the mode comprises:
all drive wheels of the AV in contact with a surface.

6. The method as in claim 1 wherein the mode comprises:
a subset of drive wheels of the AV in contact with a surface.

7. The method as in claim 1 wherein the occupancy grid comprises:
occupancy data based on data from sensors mounted upon the AV.

8. The method as in claim 1 wherein the occupancy grid comprises:
occupancy data based on LIDAR sensors mounted upon the AV.

9. The method as in claim 1 wherein the occupancy grid comprises:
occupancy data based on at least one camera mounted upon the AV.

10. The method as in claim 1 wherein the occupancy grid comprises:
occupancy data based a combination of LIDAR sensors, cameras, radar, and sonar mounted upon the AV.

11. A system for spinning an autonomous device (AV) in place comprising:
a processor executing instructions including:
(a) receiving a mode of the AV and coordinates of a destination to which the AV is headed;
(b) determining an axis of rotation of the AV based on the mode;
a turn processor executing instructions including:
(c) determining a clockwise rotation angle $\alpha$ and a counterclockwise rotation angle $\beta$ between a current heading of the AV and the destination; and
(d) setting a rotation direction of the AV to counterclockwise if $\alpha \geq \beta$, and setting the rotation direction to clockwise if $\alpha < \beta$;
a path processor executing instructions including:
(e) determining a path to reach the destination including:
(f) enabling the AV to travel along the path;
(g) if the AV is at the destination, returning to (a); and
(h) if the AV is not at the destination, returning to (b).

12. The system as in claim 11 wherein determining the path to reach the destination comprises:
the processor executing instructions including:
(i) determining a first length of a first line between the axis of rotation and a first corner a 2D depiction of the AV;
(j) drawing a second line of the first length, the second line beginning at the axis of rotation and extending, perpendicularly, through a first boundary of the 2D depiction of the AV;
(k) determining a second length of a third line between the axis of rotation and a second corner of the 2D depiction of the AV;
(l) drawing a fourth line of the second length, the fourth line beginning at the axis of rotation and extending, perpendicularly, through a second boundary of the 2D depiction of the AV;
(m) drawing a first polygon around the 2D depiction of the AV, the first polygon including two opposing sides, each of the two opposing sides being a third length equaling a summation of the first length and the second length, the including the first boundary and the second boundary, the first boundary and the second boundary connecting opposing ends of the two opposing sides, the first polygon including a leading corner of the 2D depiction of the AV, the leading corner being chosen based on the rotation direction;
(n) creating the path by laying lines a fourth length of the first boundary end to end between the AV and the destination;
(o) determining a second polygon based on turn points;
(p) accessing an occupancy grid spatially coinciding with the second polygon;
(q) determining obstacles within the second polygon based on the occupancy grid; and
(r) if the obstacles are found in the second polygon, changing the rotation direction and returning to (n).

13. The system as in claim 11 wherein the mode comprises:
at least one configuration of the AV.

14. The system as in claim 11 wherein the mode comprises:
at least one configuration of wheels of the AV.

15. The system as in claim 11 wherein the mode comprises:
all drive wheels of the AV in contact with a surface.

16. The system as in claim 11 wherein the mode comprises:
a subset of drive wheels of the AV in contact with a surface.

17. The system as in claim 11 wherein the occupancy grid comprises:
occupancy data based on data from sensors mounted upon the AV.

18. The system as in claim 11 wherein the occupancy grid comprises:

occupancy data based on LIDAR sensors mounted upon the AV.

19. The system as in claim 11 wherein the occupancy grid comprises:
   occupancy data based on at least one camera mounted upon the AV.

20. The system as in claim 11 wherein the occupancy grid comprises:
   occupancy data based a combination of LIDAR sensors, cameras, radar, and sonar mounted upon the AV.

* * * * *